(12) United States Patent  (10) Patent No.: US 7,563,099 B1
Iftikhar  (45) Date of Patent: Jul. 21, 2009

(54) MULTI-MEDIA METHOD AND APPARATUS FOR TEACHING LANGUAGE

(76) Inventor: Elizabeth Iftikhar, P.O. Box 117, 965 Point Seaside Ave., Crystal Beach, FL (US) 34681

( * ) Notice: Subject to any disclaimer, the term of this patent is extended or adjusted under 35 U.S.C. 154(b) by 0 days.

(21) Appl. No.: 09/578,168

(22) Filed: May 22, 2000

Related U.S. Application Data

(60) Provisional application No. 60/135,303, filed on May 21, 1999.

(51) Int. Cl.
G09B 1/00 (2006.01)
(52) U.S. Cl. ........................................ 434/167; 434/156
(58) Field of Classification Search ................. 434/156, 434/157, 167, 176, 178, 185, 307 R, 308–311, 434/314, 317, 318
See application file for complete search history.

(56) References Cited

U.S. PATENT DOCUMENTS

| 5,120,230 | A | * | 6/1992 | Clark et al. | 434/307 R |
|---|---|---|---|---|---|
| 5,451,163 | A | * | 9/1995 | Black | 434/178 |
| 5,741,136 | A | * | 4/1998 | Kirksey et al. | 434/169 |
| 5,788,503 | A | * | 8/1998 | Shapiro et al. | 434/172 |
| 5,813,861 | A | * | 9/1998 | Wood | 434/169 |
| 5,885,083 | A | * | 3/1999 | Ferrell | 434/156 |
| 6,089,943 | A | * | 7/2000 | Lo | 446/175 |
| 6,632,094 | B1 | * | 10/2003 | Falcon et al. | 434/178 |
| 6,669,478 | B2 | * | 12/2003 | Edwards et al. | 434/159 |
| 6,802,717 | B2 | * | 10/2004 | Castro | 434/169 |
| 6,884,076 | B2 | * | 4/2005 | Clark et al. | 434/172 |
| 6,986,663 | B2 | * | 1/2006 | Budra et al. | 434/169 |
| 7,006,786 | B2 | * | 2/2006 | Marcus et al. | 434/362 |

* cited by examiner

*Primary Examiner*—Kurt Fernstrom
(74) *Attorney, Agent, or Firm*—Bruce E. Weir

(57) ABSTRACT

An apparatus and method for teaching early receptive language, especially to infants, young children, the learning disabled, and hearing impaired, comprises a multi-media medium for displaying a set of visual images and their corresponding audio in the language of choice. The multi-media apparatus includes the requisite controls to stop, play, reverse, forward and pause the images being displayed. The method consists of displaying a series of visual images of an object containing comparable but not identical objects on a screen and providing an accompanying audio to describe the objects. This method of repetition and categorization is reinforced by concluding a set of series with a faster paced flow of some objects in the series. Further reinforcement of the concepts is accomplished by the use of textual material. With this method and apparatus parents and teachers can enhance the receptive language and categorization skills of infants, young children, the learning disabled and hearing impaired.

14 Claims, 5 Drawing Sheets

MULTI-MEDIA METHOD AND APPARATUS FOR TEACHING LANGUAGE

Benefit of U.S. Provisional Application No. 60/135,303 filed May 21, 1999 is hereby claimed.

FIELD OF INVENTION

The method of this invention relates to the field of early childhood learning and early learning of receptive and spoken language. The method may be embodied in various forms of teaching apparatus which are designed to present images and sounds. A video tape with soundtrack is one such apparatus. The use of a multimedia computer apparatus is particularly advantageous with the method.

BACKGROUND OF THE INVENTION

Infants and young children learn receptive (understood) language naturally through day to day interactions with their caregivers, typically their parents. An important component of this process is verbal labeling by the caregiver. For example, when a dog is in view, a parent might say "Look, that's a dog". Parents and other caregivers also label items in picture books to infants by simply pointing at the picture and naming the object at which they are pointing. This type of interaction initially suffices to help the infant or child associate the word and the object. Generally, this type of learning process tends to be somewhat long as these sorts of interactions between caregiver and child occur interspersed throughout the day, as the adult has time and notices an object of interest to the child.

The language learning process is complicated by the fact that, in any given language, most words other than proper names chosen to be initially introduced to a child usually correspond not just to one particular object alone, but to a whole class of objects. For instance the word "dog" corresponds not just to one particular dog, but to a whole class of animals including Great Danes, Chihuahuas, and Poodles as well as toy dogs. Thus, conveying the idea of dog as a class of object requires a great many of these types of caregiver/child interactions.

The window for effectively learning any language well opens early in childhood but closes as the child grows older. In fact, most of an individual's native language is learned before the age of three. Children who have not learned a language well by this age may carry forward a serious learning handicap into adulthood. For the learning disabled, it is particularly crucial to take advantage of this period of time.

There are many materials and methods available for assisting parents and caregivers in educating their infants and young children in language learning but these materials and methods do not fully help a caregiver or parent maximize the learning window for language in infants and children. Language learning is a building process, and the mastery of one skill leads to the mastery of another. Thus, with infants and young children, time is of the essence in early intellectual development.

PRIOR ART

The majority of language teaching aids and methods are addressed to older age groups who already recognize words or objects and can vocalize the word describing the object. None address the method of presentation of the name of objects contained within a class of objects as is taught by the present inventive method. In U.S. Pat. No. 5,885,083 Ferrell teaches a system and method for speech training using many sensory inputs to evoke a reflexive response to vocabulary elements such as phonemen, words, and phrases. In U.S. Pat. No. 5,562,453 Wen teaches a speech tutor toy which employs microphones and computer comparison analysis to note and reinforce speech of children in a biofeedback system. Wen requires responses specific to the items presented.

Siegel, in U.S. Pat. Nos. 5,799,267 and 6,009,397 describes a device and method for teaching children to sound out and name items based upon the matching of the sound of speech components with a stored database of such components. For instance, a letter may be depicted along with a number of pictures showing items beginning with the common letter sound. Cohen, in U.S. Pat. Nos. 5,964,593 and 5,893,720 describes a computer toy for infants used in speech development which reinforces the sounds a baby or young child might make. Various sounds are presented and the device listens to the sounds a child makes to see if the child mimics the presented sound.

SUMMARY OF THE INVENTION

This invention first provides a method that parents and caregivers can utilize to accelerate exposure of infants, young children and the learning disabled to labeling sessions for receptive language learning. Second, the method can be easily implemented using audio visual devices such as video cassettes or computers. The principal objective of this invention is to assist caregivers in their efforts to maximize the learning window for early language development to help infants and young children learn early receptive language. The learning experience can be in a native or second language. The method provides simple specifically structured labeling sessions that include many examples of a class of object or action corresponding to a particular word.

Initially, an infant or child is visually presented with an image of a generic example of the class of object or action. The object or action depicted in the image is presented in such a way that it is clearly the focus of the visual presentation. In addition to the visual presentation, the sound of the word corresponding to the object or action is presented. In a further embodiment, the written word corresponding to the object or action also visually presented.

After the initial presentation of the visual and audio example of an object or action, the infant or child is then visually presented with many varieties of the object or action in context (for example, a object may be shown in use). These presentations may be with or without auditory and written labeling, but in the preferred embodiment, no auditory or written labeling is used with these further examples.

At the end of the sequence, the infant is again visually presented with a generic example of the object or action in such a way that the object or action in question is clearly the focus of the visual display, and once again auditory and written labeling occurs.

In a most preferred embodiment of the invention an additional review procedure is followed. Once all the words are introduced by the sequence outlined above, the presentation of the words is repeated in a similar fashion using the same or different representative objects for each word. During this repeat presentation, after every few words have been reviewed, the generic single object presentation for each word (containing the written word and its accompanying audio pronunciation) is repeated for all the words just covered. These single object presentations essentially form a visual and audio "flash card" of the word to reinforce the learning experience for the child. This cycle of presentations and flash cards is repeated until all the words have been reviewed.

It is therefore a first object of this invention to provide an accelerated means for learning of early receptive language by infants, children and the learning disabled.

A further objective of this invention is to provide a method of language presentation which first displays an image of an object or action alone, and secondly presents one or more images of the object or action in context, wherein such first and second presentations may concurrently have an audio accompaniment of the spoken word associated with the object or action displayed in the image.

A further objective of this invention is to provide apparatus incorporating the method of the invention which may be used to display the sequence of images required by the method.

Yet a further objective of this inventions is to provide an audio playback apparatus which may be used with the visual presentation apparatus to provide the audio component of the method of this invention.

A further objective of this invention to provide a method and device for receptive language learning through an automated means.

Another objective of this invention is to provide this information in a format that is entertaining for, and holds the attention of, infants and young children.

An additional object of this invention to provide all the benefits described above to children or infants with hearing impairments or deafness.

DESCRIPTION OF THE FIGURES

The figures are actual screen captures from a video tape which implements the method of this invention.

DETAILED DESCRIPTION

Figure 1:
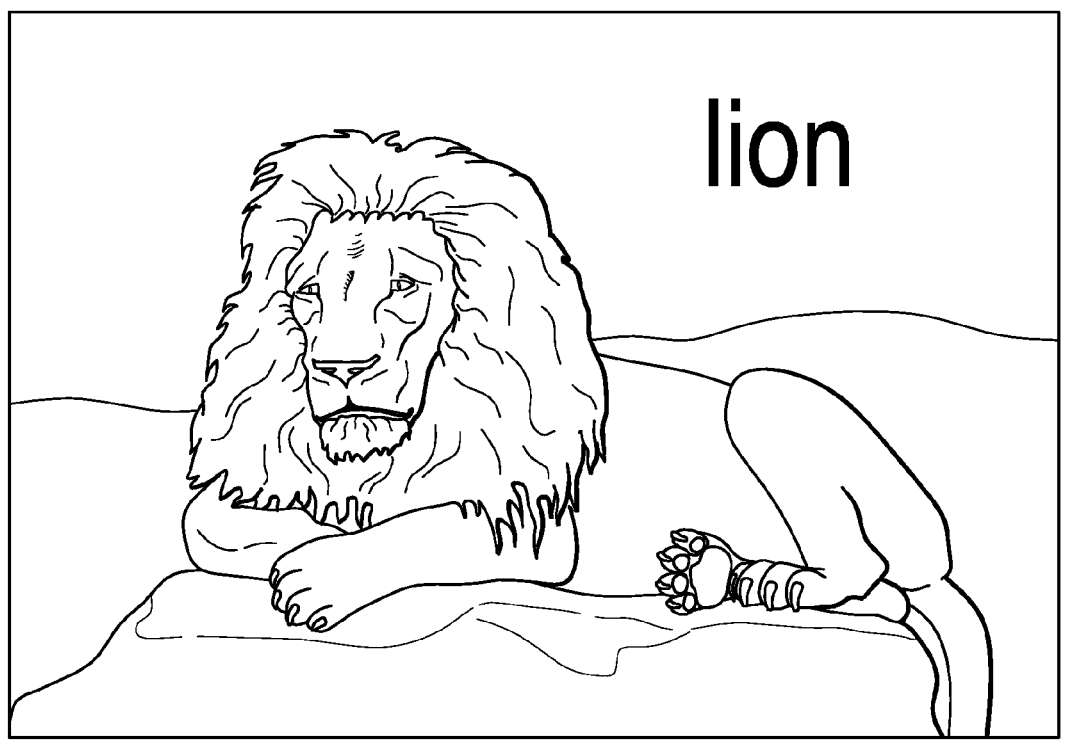
FIG. 1 shows an initial presentation of an object, a lion, with the word "lion" appearing in a corner of the image. The audio track accompanying FIG. 1 has the spoken word "lion".

This invention provides a novel method for accelerating the development of receptive language in infants, young children and the learning disabled. The invention makes use of single or multiple media methodologies/devices to provide an organized and enjoyable approach to learning early receptive and spoken vocabulary. In this description, it is convenient to describe the invention in terms of the presentation of an "object". It should be understood, however, that an "object" may be either an actual physical object or an action.

For each of several vocabulary words that it is desired to teach, the following presentation format is used in the preferred embodiment. Using the method and device according to this invention, an infant or young child is first visually presented with an image of an object representative of a class of objects in which the image of the object is presented by itself. Simultaneously with the presentation of the first image of the object, the child is presented with the text word corresponding to the object and the sound of the spoken text word for the object. After this first presentation, the child is presented with a series of visual images of other objects representative of the same class of object as the object first presented. These subsequent presentations feature the object in great variety of forms and context. This method provides the infant or young child with a composite sense of that word as it pertains to a class of object that would by normal means be conveyed over a much longer time period. Several different images are presented. During the image presentations following the first presentation, an audio accompaniment is provided consisting of simple, light, cheerful background music designed to please a child but not distract the child's attention. The volume level of the audio is subdued. This background music also serves to attract the child's attention and keep the child interested in the image presentations. The final image presented in the sequence again shows a generic version of the object accompanied by the text word for the object and the audio pronunciation of the text word.

As many vocabulary words as desired are introduced in this fashion. The number of words in each lesson is appropriate for the age and attention span of the child. A very young child may be presented with few new vocabulary words, whereas an older child may be presented with many in one session.

In the most preferred embodiment, after the entire set of objects is initially presented as described, the entire set of objects (words) are presented again in brief review segments which enhance absorption of information by providing repetition that is particularly effective in conveying information to infants and young children. In this second round of presentations the object is introduced as in the first presentation; that is with an initial generic image accompanied by the text word and audio pronunciation. Then again other representative examples are presented. These representative examples may be the same as were presented the first time or they may be different. Also, in this second round, fewer examples of the class may be presented than were used in the first round. The sequence for each word again concludes with an image labeled with text and the audio pronunciation of the text. After every few words have been reviewed in this manner, a generic single object presentation for each word (containing the text word and its accompanying audio pronunciation) is repeated for all the words just covered. These single object presentations essentially form a visual and audio "flash card" of the word to reinforce the learning experience for the child. This cycle of presentations and flash cards is repeated until all the words have been reviewed. The images presented in the repeat cycles may presented at a faster pace, when appropriate, than the pace used in the initial presentations.

Another round of presentations may be repeated yet again if the child's attention span is great enough. However, it should be appreciated that with extremely young children, the amount of material and time spent should be appropriately limited. At the end of the presentation sequences, the audio visual flash cards for all the words may be repeated.

The method of this invention may be additionally characterized as follows:

In the preferred embodiment, presentation of "FULL WORD SEGMENT FORMAT" described below for any number of words.

In the most preferred embodiment, presentation of the "FULL WORD SEGMENT FORMAT" followed by presentation of the "REVIEW SEGMENT FORMAT" described below, for vocabulary previously featured in the "FULL WORD SEGMENT FORMAT".

Full Word Segment Format

Step 1: First Presentation

Visual—The child is first visually presented with an image of a simple representative object of the class of object represented by the vocabulary being taught. This object is carefully presented so that it is clearly the visual focus of the presentation. In other words, backgrounds are kept to a minimum so as not to distract from the object being featured. The object being displayed should be representative of that class of object—that is, the item featured should be "average" within that class of object. The visual display may also contain printed words or sign language corresponding to the object.

Auditory—An audio presentation of the sound of the associated word is presented in conjunction with the image. This is achieved by simple verbal labeling of the word that is being taught, either by simply stating the word, or by using a simple sentence such as "that is a dog", if "dog" were the featured word.

Step 2: Second Presentation

Visual—This presentation includes a sequence of several visual presentations of the object in great variety of object type and context. This series of visual presentations features objects that are representative of their class, but which provide more variety of style and type than presented in the first or last visual presentations. Visual backgrounds for these presentations may provide a context for the objects. For example, an object might be shown in use rather than alone. The visual display may also contain printed words or sign language.

Auditory—Generally a music provides an audio background. However, spoken labeling may range from none, to simple labeling, to a simple sentence such as "look, that is a dog" if "dog" were the word being taught.

Step 3: Third Presentation

Visual—The presentation series concludes with a final visual presentation of a simple representative object of the class of object representing the vocabulary being taught. Once again, as in the first presentation, the object is carefully presented so that it is clearly the focus of the visual presentation. In other words, backgrounds are kept to a minimum so as not to distract from the object being featured. The object being presented should again be representative of that class of object—so that the item featured should be "average" within that class of object. The visual display may also contain printed words or sign language.

Auditory—Verbal labeling may range from none, to simple labeling, to a simple sentence such as "look, that dog is eating" if dog were the word being taught.

Review Segment Format

Visual—The words previous taught are presented again by a sequence of presentations using the First Presentation format of the "Full Word Segment Format". Different images may be substituted for some of the images used initially. Again, these items are carefully presented so that they are clearly the focus of the visual presentations. In other words, backgrounds are kept to a minimum so as not to distract from the object being featured. The objects being displayed should be representative of their class of object—so that the item featured should be "average" within that class of object. The visual display may also contain printed words or sign language. After every few objects (words) are presented, a generic representative image for each word containing the text and audio pronunciation is presented as a visual and audio "flash card". The cycle is repeated until all words have been reviewed.

Auditory—Simple labeling by using the words that are being taught. Either by simply stating the word, or by using a simple sentence such as "that is a dog", if "dog" were the featured word.

Figure 2:
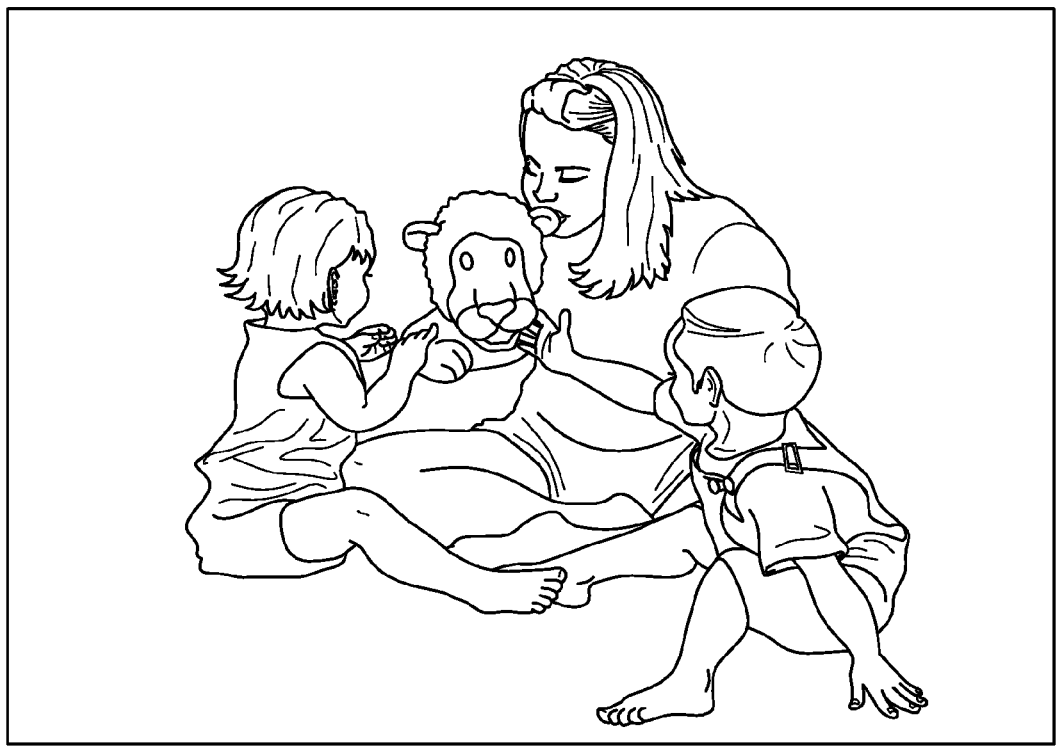
FIG. 2 shows a stuffed toy lion being used to entertain children.
Figure 3:
FIG. 3 shows another real lion but of a gender different from that of FIG. 1.
Figure 4:
FIG. 4 shows a child with a stuffed toy lion which is different from the first stuffed toy lion shown in FIG. 2.
Figure 5:
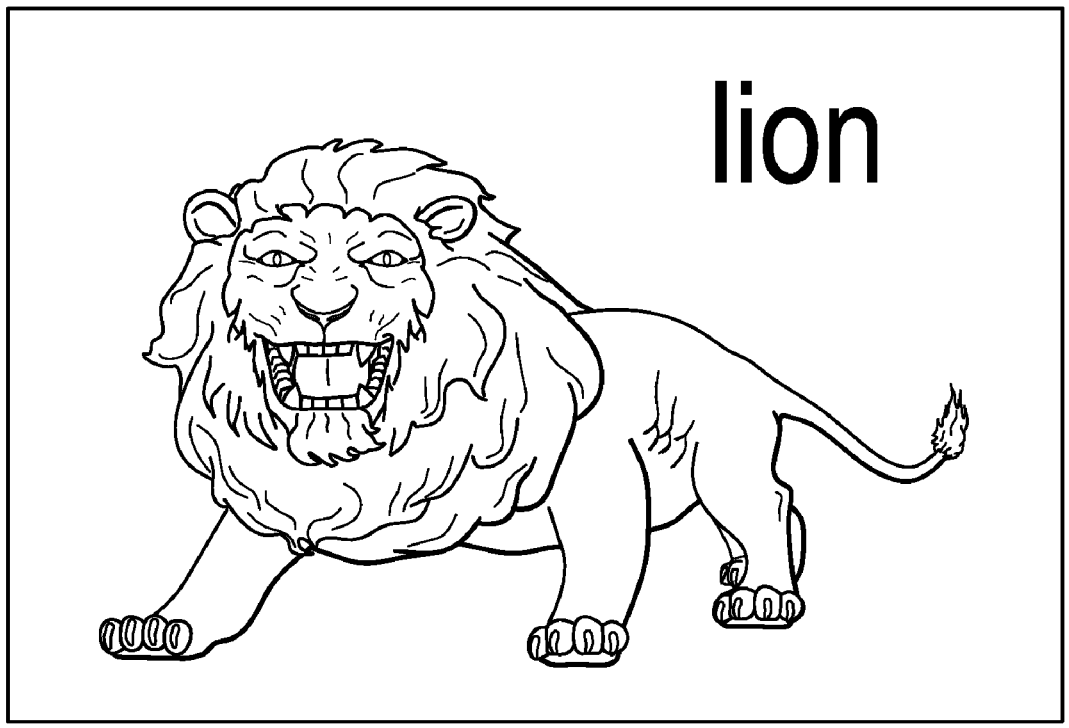
FIG. 5 shows a toy lion against a plain background with the word "lion" appearing in a corner of the image. The audio track accompanying FIG. 5 has the spoken word "lion".

An example of the presentation method is shown in the five Figures. In FIG. 1 the object "lion" is introduced by visually showing a male lion along with the word "lion". The accompanying audio presents the spoken word lion. FIGS. 2-5 then show different representations of "lions". FIG. 2 shows a stuffed toy lion being played with to entertain children. While the lion is shown with children, the remainder of the scene comprises a plain background. A simple and unobtrusive musical background is provided. FIG. 3 shows another representative lion, this time a female lion in a realistic setting. The simple musical background continues. FIG. 4 shows a child with another example of a stuffed lion which is different than the toy stuffed lion shown in FIG. 2. The musical background is continued. Finally, FIG. 5 shows a toy lion which looks somewhat like the first lion but is clearly different. The word "lion" is again displayed and the audio has the spoken word "lion". In the method of this invention, each object (word) is introduced with a full set of images such as the above.

For the second round of presentation many of the same images are used, but some new ones representing the same class of objects can be inserted. Generally, the second presentation round contains fewer images than the first round. The objects may also be presented in a different order during the second round. After every few words, an audio and visual "flash card" for the previously covered words are presented. At the conclusion of the lesson, the first image and audio presented for each object may be presented again by itself. The number of rounds and the number of objects presented in any given lesson may be varied.

Further Examples of the Presentation Method:

An example of the application of the teaching method in use in a videotape format is included and a sample of the type of scripting and video taping that can be used is as follows (see full word segment format):

Vocabulary Word: DOG

| Visual Presentation | Background | Auditory Presentation | Text or Sign Language |
| --- | --- | --- | --- |
| Close up of a whole dog | Very plain background | "Dog" pronounced | "Dog" in print in corner of screen |
| Dog playing with a child | Room like setting | Background Music | None |
| Dog running | Outdoors, a field | Background Music | None |
| Dog on leash | A kennel | Background Music | None |
| Child holding a dog | Plain Background | Background Music | None |
| Close up of a dog's face | Minimal Background | "Dog" pronounced | "Dog" in print in corner of screen |

Vocabulary Word: BANANA

| Visual Presentation | Background | Auditory Presentation | Text or Sign Language |
|---|---|---|---|
| Still shot of a banana | Very plain background | "Banana" pronounced | "Banana" in print in corner of screen |
| Boy eating a banana | Seamless white background | Background Music | None |
| Child peeling a banana | Room like setting | Background Music | None |
| A bunch of bananas | Seamless white background | Background Music | None |
| Bananas Arranged in a pattern, then disappearing one by one | Seamless white background | Background Music | None |
| Still shot of a banana face | Seamless white background | "Banana" pronounced | "Banana" in print in corner of screen |

Vocabulary Word: AIRPLANE

| Visual Presentation | Background | Auditory Presentation | Text or Sign Language |
|---|---|---|---|
| Still shot of an airplane | Plain background | "Airplane" pronounced | "Airplane" in print in corner of screen |
| Hand playing with a toy airplane | Seamless white background | Background Music | None |
| Airplane taking off | Airport sky | Background Music | None |
| Airplane flying | Sky | Background Music | None |
| Close up of an airplane | Seamless white background | "Airplane" pronounced | "Airplane" in print in corner of screen |

A sequence of five or so of these types of scenes can be followed up with brief flash card type reviews of the vocabulary illustrated. For example the previous sequence (the full word segment format) would be followed by a segment like the following (see review segment format):

Vocabulary Words "Flash Cards":

| Visual Presentation | Background | Auditory Presentation | Text or Sign Language |
|---|---|---|---|
| Close up of a dog | Plain background | "Dog" pronounced | "Dog" in print in corner of screen |
| Close up of a banana | Plain background | "Banana" pronounced | "Banana" in print in corner of screen |
| Still shot of a plane | Plain background | "Plane" pronounced | "Plane" in print in corner of screen |

Presentation Media

The visually perceptible medium that is used to present the images of the objects can comprise printed materials such as books, booklets, flash cards, projected images from slides, printed materials, videotape, computer monitors, projections of computer displays wherein the images (and any accompanying sounds) may be contained on CDs, diskettes, DVDs, videotapes etc. The audio of the spoken words associated with the images may be provided by the caregiver in person, or by sound recordings played back on appropriate instruments. In preferred embodiments, the sound recordings are contained on the same medium as the visual images; ie; on video tapes, CDs, magnetic media, etc. The inventor has implemented the method of this invention on video cassettes containing both the visual images and the sound.

Text Presentations:

In a text/picture format each word would be represented in it's simplest pictorial format with or without printed words or representations of sign language, and also represented in varied forms and contexts again with or without printed words or representations of sign language. The printed media presentations of this invention may be accompanied with a digital or analog means of generating the corresponding audio representations of the words.

A preferred format for a book or booklet includes a book that contains main pages as well as sub-pages. The main pages contain the more simple, generalized representational item of the class and the sub-pages include the more varied representations of the object and representations of the object in context. The booklet is formatted in such a way that the main pages are visible while the user views the associated sub-pages.

Alternatively, flashcards may be created embodying the principles of the method of instruction of this invention. A preferred format for a set of flashcards includes a set of flash cards that contain primary flashcards as well as secondary flashcards. The primary flashcards contain the more simple, generalized representational item of the class and the secondary flashcards include the more varied representations of the object and representations of the object in context. The flashcards are formatted in such a way that the primary flashcards contain a single large image while the secondary flashcards contain a number of smaller images. The flashcards may contain their own digital or analog means of generating the corresponding audio representations of these words, either by the adult triggering the sound or by the child handling the card. The printed media presentations implementing the method of this invention may also contain representations of the language being taught in the characters of the appropriate written language or those of a sign language.

Audiovisual and Computer Media Presentations

The presentation methods employed according to this invention may also comprise audiovisual material including, but not limited to, the use of one or more videotapes, electronic media for storage on a computer such as CD's, diskettes etc. as well as DVDs (digital videodiscs). When the media series utilizes an electronically stored format, various levels of difficulty of vocabulary can be provided so that the caregiver or user may customize instruction to an appropriate level for the child.

In the audiovisual format the method would offer instruction in receptive vocabulary in accordance with the described utilizing the "FULL WORD SEGMENT FORMAT" and may also include the "REVIEW SEGMENT FORMAT" described previously.

In the computerized format the method would offer instruction similar to that of the audiovisual series but also allow the incorporation of positive reinforcement and user interaction through a touch-screen, keyboard, mouse or similar device. The computerized format can also allow for substantial customization of the instruction and labeling sections including but not limited to the introduction of more than one language through this methodology.

It is therefore seen that the present invention offers a unique method and device for enhancing and accelerating the development of receptive language in infants, young children, the learning disabled and hearing impaired. The present invention can be delivered in multiple media forms for teaching and enhancing receptive language in one or more languages.

It is understood that various details of the invention may change without departing from the spirit of the invention.

I claim:

1. An audio visual method for enhancing receptive language learning by a young child by presenting the child with a set of vocabulary words, comprising the following steps:
   a. visually presenting to the child a first image, the first image being displayed on a first visually perceptible medium, the first image being a generic example of the class of object or action associated with a first word in which the object or action depicted in the first image is presented in such a way that it is clearly the focus of the visual presentation, the first image having a low level of abstraction with respect to the class of object or action associated with the first word;
   b. simultaneously with the visual presentation, presenting the sound of the first word corresponding to the object or action;
   c. simultaneously with the visual presentation and the sound presentation, presenting a visual image of the text of the first word corresponding to the object or action;
   d. after presentation of the first image, the sound of the first word, and the visual image of the text of the first word, visually presenting the child with a second image, the second image being displayed on a second visually perceptible medium, the second image being an example of the class of object or action associated with the first word, the second image having a higher level of abstraction than the first image with respect to the class of object or action associated with the first word;
   f. after presentation of the second image, visually presenting the child with a third image, the third image being displayed on a third visually perceptible medium, the third image being an example of the class of object or action associated with the first word, the third image having a higher level of abstraction than the first image with respect to the class of object or action associated with the first word;
   g. at the end of the sequence, visually presenting the child with a fourth image displayed on a fourth visually perceptible medium, the fourth image being a generic example of the object or action associated with the first word, the fourth image being presented in such a way that the object or action is clearly the focus of the visual display, the fourth image having a low level of abstraction with respect to the class of object or action associated with the first word;
   h. simultaneously with the visual presentation at the end of the sequence, presenting the sound of the first word corresponding to the object or action;
   i. simultaneously with the visual presentation and the sound presentation at the end of the sequence, presenting a visual image of the text of the first word corresponding to the object or action; and
   j. repeating the above steps for each subsequent vocabulary word presented.

2. The method of claim 1 further comprising the following steps:
   a. repeating the presentation of the words using the same or different representative objects for each word;
   b. during the repeat presentation, after every few words have been reviewed, presenting a generic single object presentation for each word (containing the written word and its accompanying audio pronunciation) for all the words just covered; and
   c. continuing the cycle of presentations until all the words have been reviewed.

3. An audio visual method for enhancing receptive language learning by a young child by presenting the child with a set of vocabulary words as claimed in claim 1, wherein the first visually perceptible medium is selected from the group consisting of books, booklets, and flashcards.

4. An audio visual method for enhancing receptive language learning by a young child by presenting the child with a set of vocabulary words as claimed in claim 1, wherein the first visually perceptible medium is selected from the group consisting of computer monitors and video monitors.

5. An audio visual method for enhancing receptive language learning by a young child by presenting the child with a set of vocabulary words as claimed in claim 1, wherein the second visually perceptible medium is selected from the group consisting of books, booklets, and flashcards.

6. An audio visual method for enhancing receptive language learning by a young child by presenting the child with a set of vocabulary words as claimed in claim 1, wherein the second visually perceptible medium is selected from the group consisting of computer monitors and video monitors.

7. An audio visual method for enhancing receptive language learning by a young child by presenting the child with a set of vocabulary words as claimed in claim 1, wherein the third visually perceptible medium is selected from the group consisting of books, booklets, and flashcards.

8. An audio visual method for enhancing receptive language learning by a young child by presenting the child with a set of vocabulary words as claimed in claim 1, wherein the third visually perceptible medium is selected from the group consisting of computer monitors and video monitors.

9. An audio visual method for enhancing receptive language learning by a young child by presenting the child with a set of vocabulary words as claimed in claim 1, wherein the fourth visually perceptible medium is selected from the group consisting of books, booklets, and flashcards.

10. An audio visual method for enhancing receptive language learning by a young child by presenting the child with a set of vocabulary words as claimed in claim 1, wherein the fourth visually perceptible medium is selected from the group consisting of computer monitors and video monitors.

11. An audio visual method for enhancing receptive language learning by a young child by presenting the child with a set of vocabulary words, comprising the following steps:
   a. visually presenting to the child a first image, the first image being projected onto a visually perceptible medium with a projection device, the first image being a generic example of the class of object or action associated with a first word in which the object or action depicted in the first image is presented in such a way that it is clearly the focus of the visual presentation, the first image having a low level of abstraction with respect to the class of object or action associated with the first word;
   b. simultaneously with the visual presentation, presenting the sound of the first word corresponding to the object or action;
   c. simultaneously with the visual presentation and the sound presentation, presenting a visual image of the text of the first word corresponding to the object or action;
   d. after presentation of the first image, the sound of the first word, and the visual image of the text of the first word, visually presenting the child with a second image, the second image being projected onto the visually perceptible medium with the projection device, the second image being an example of the class of object or action associated with the first word, the second image having a higher level of abstraction than the first image with respect to the class of object or action associated with the first word;

e. after presentation of the second image, visually presenting the child with a third image, the third image being projected onto the visually perceptible medium with the projection device, the third image being an example of the class of object or action associated with the first word, the third image having a higher level of abstraction than the first image with respect to the class of object or action associated with the first word;

f. at the end of the sequence, visually presenting the child with a fourth image projected onto the visually perceptible medium with the projection device, the fourth image being a generic example of the object or action associated with the first word, the fourth image being presented in such a way that the object or action is clearly the focus of the visual display, the fourth image having a low level of abstraction with respect to the class of object or action associated with the first word;

g. simultaneously with the visual presentation at the end of the sequence, presenting the sound of the first word corresponding to the object or action;

h. simultaneously with the visual presentation and the sound presentation at the end of the sequence, presenting a visual image of the text of the first word corresponding to the object or action; and i. repeating the above steps for each subsequent vocabulary word presented.

12. The method of claim 11 further comprising the following steps:

a. repeating the presentation of the words using the same or different representative objects for each word;

b. during the repeat presentation, after every few words have been reviewed, presenting a generic single object presentation for each word (containing the written word and its accompanying audio pronunciation) for all the words just covered; and c. continuing the cycle of presentations until all the words have been reviewed.

13. An audio visual method for enhancing receptive language learning by a young child by presenting the child with a set of vocabulary words as claimed in claim 11, wherein the projection device is selected from the group consisting of slide projectors and digital image projectors.

14. An audio visual method for enhancing receptive language learning by a young child by presenting the child with a set of vocabulary words, comprising the following steps:

a. using visual display means to display an initial image to the child, the initial image being a generic example of the class of object or action associated with a first word in which the object or action depicted in the initial image is displayed in such a way that it is clearly the focus of the visual presentation, the initial image having a low level of abstraction with respect to the class of object or action associated with the first word;

b. simultaneously with the visual display of the initial image, using sound reproduction means to reproduce the sound of the first word corresponding to the object or action;

c. simultaneously with the visual display of the initial image and reproduction of the sound of the first word, using visual display means to display a visual image of the text of the first word corresponding to the object or action;

d. after display of the first image, reproduction of the sound of the first word, and display of the visual image of the text of the first word, using display means to display a sequence of images to the child, the images in the sequence being examples of the class of object or action associated with the first word, each image in the sequence of images having a higher level of abstraction than the initial image with respect to the class of object or action associated with the first word;

e. after display of the sequence of images, using display means to display a final image to the child, the final image being a generic example of the object or action associated with the first word, the final image being presented in such a way that the object or action is clearly the focus of the visual display, the final image having a low level of abstraction with respect to the class of object or action associated with the first word;

f. simultaneously with the display of the final image, using sound reproduction means to reproduce the sound of the first word corresponding to the object or action;

g. simultaneously with the display of the final image and reproduction of the sound of the first word, using display means to display a visual image of the text of the first word corresponding to the object or action; and h. repeating the above steps for each subsequent vocabulary word presented.

\* \* \* \* \*